US005286298A

United States Patent [19]

Milner et al.

[11] Patent Number: 5,286,298

[45] Date of Patent: Feb. 15, 1994

[54] DEVICE AND METHOD FOR REDUCING CRYSTAL IMPACT DAMAGE AND LUMP FORMATION IN A SUGAR CENTRIFUGAL

[75] Inventors: Ted D. Milner, Westminster; Robert V. Zimmerman, Denver; Myles G. Hill, Aurora, all of Colo.

[73] Assignee: Silver Engineering Works, Inc., Aurora, Colo.

[21] Appl. No.: 808,415

[22] Filed: Dec. 13, 1991

[51] Int. Cl.[5] .......... B01J 3/00; B04B 3/00; B04B 15/00

[52] U.S. Cl. .......... 127/2; 127/17; 127/19; 127/56; 210/781; 494/60

[58] Field of Search .......... 127/19, 17, 56, 2; 210/781, 787, 360.1, 369, 406; 494/60

[56] References Cited

U.S. PATENT DOCUMENTS

| | | | |
|---|---|---|---|
| 3,490,947 | 1/1970 | Grieselhuber | 127/19 |
| 4,033,879 | 7/1977 | Nah et al. | 127/56 |

*Primary Examiner*—R. Bruce Breneman
*Assistant Examiner*—P. L. Hailey
*Attorney, Agent, or Firm*—Robert F. Palermo

[57] ABSTRACT

An apparatus and method for reducing sugar, crystal impact damage and lump formation in a centrifugal provides a resilient barrier ring which absorbs most of the impact energy of the crystals and which deflects the crystals so they are not struck by trailing high speed crystals. An air flow causes vibration of the barrier ring to prevent crystal sticking which could lead to lump formation. This air flow also reduces moisture content in the sugar housing to further reduce lump formation.

4 Claims, 1 Drawing Sheet

DEVICE AND METHOD FOR REDUCING CRYSTAL IMPACT DAMAGE AND LUMP FORMATION IN A SUGAR CENTRIFUGAL

BACKGROUND OF THE INVENTION

This invention relates generally to sugar making machinery and more particularly to devices and methods for achieving improvements in sugar centrifugals which provide reduced lump formation together with reduced crystal impact damage.

Sugar making requires several operations for separating massecuite into sugar crystals and molasses (or runoff), its two components. In all cases except for separation of high grade sugar crystals, the crystals are remelted and further refined. The quality and integrity of the crystals after separation is therefore of minimal consequence except in the case of high grade sugar.

Broken crystals require downgrading of sugar product, and they must, therefore, be avoided. However, the viscosity of the molasses component of the massecuite requires centrifugal separation in order to free the sugar crystals of the surrounding syrup. The high discharge velocity and resultant high gravity forces imposed on the massecuite by the centrifugals frequently results in excessive damage to the high grade crystals due to high velocity impact with the wall of the sugar housing. Another contributor to crystal damage and to the resulting production losses is lump formation which may require shut-down of the centrifugal for removal of lump build-up and which also can cause jams in subsequent processing. This can result in crystal crushing due to attempts to clear such jams. Of course, lumpiness itself requires downgrading of the sugar so that, even when not combined with broken crystals, lumpiness will require some reprocessing.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a device and method for reducing crystal impact damage and lump formation in combination with a sugar centrifugal having a sugar housing surrounding a rotatable centrifugal basket, including a shock absorbing barrier ring extending downwardly from the top surface of the sugar housing to a height lower than the top edge of the centrifugal basket rotatably mounted concentrically within the barrier ring said barrier ring means comprising one substantially cylindrical member and one truncated conical member mounted concentrically outside the top edge of the centrifugal basket, said conical member being mounted within, and converging downward to make contact with, said substantially cylindrical member.

The foregoing and other aspects will become apparent from the following detailed description of the invention when considered in conjunction with the accompanying drawing figures.

BRIEF DESCRIPTION OF THE DRAWING FIGURES

FIG. 1 is a fragmentary partially sectional schematic view illustrating the top edge of one side of the basket in a typical sugar centrifugal; and FIG. 2 is a fragmentary partially sectional view illustrating a preferred embodiment of the present invention incorporated in the sugar centrifugal of FIG. 1.

DETAILED DESCRIPTION

Figure 1:
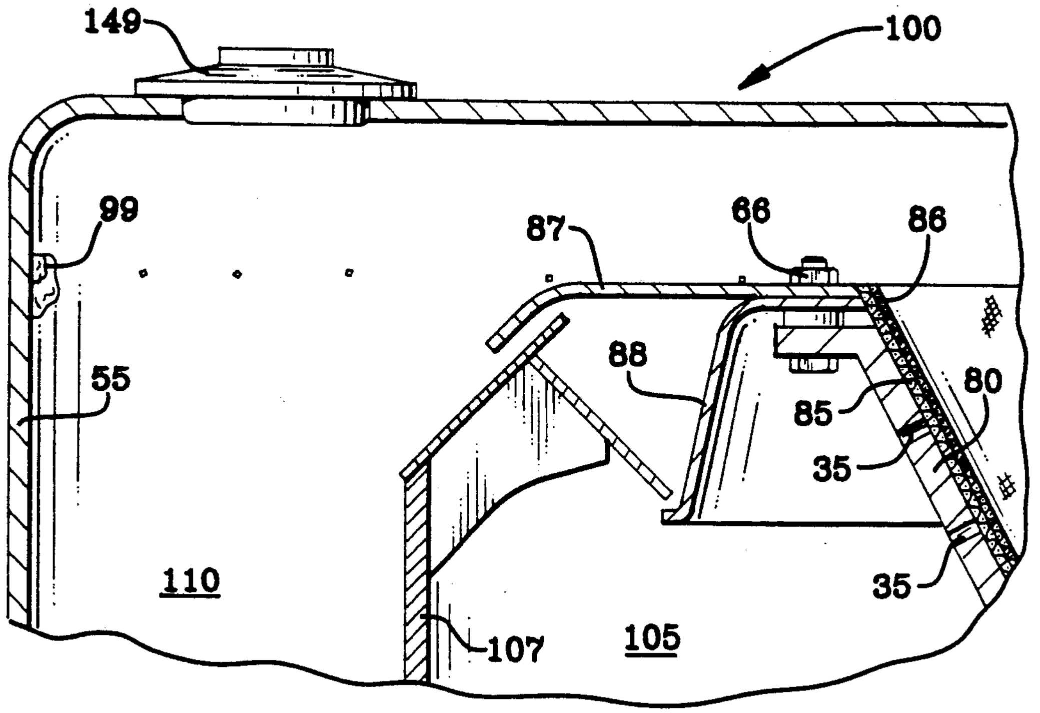

The sugar centrifugal 100 in FIG. 1 schematically illustrates, features of a typical sugar centrifugal. Centrifugal basket 80 has drain holes 35 and spins at high speed. Massecuite within the centrifugal basket separates into sugar crystals, which travel upward on fine working screen 86, and molasses, which drains through fine working screen 86, back-up screen 85 and basket drain holes 35 into molasses chamber 105. The sugar crystals pass over the rim of the basket and slide across upper shroud 87 from which they are slung outwardly to sugar housing 55. Some crystal damage may result from the impact with sugar housing 55 or with other crystals which form lump 99.

Crystals, and portions of lump 99 which periodically separate from sugar housing 55, fall into sugar chamber 110 which is separated from molasses chamber 105 by chamber wall 107. Handhole cover 149 provides visual inspection access to sugar chamber 110 of sugar housing 55.

Figure 2:
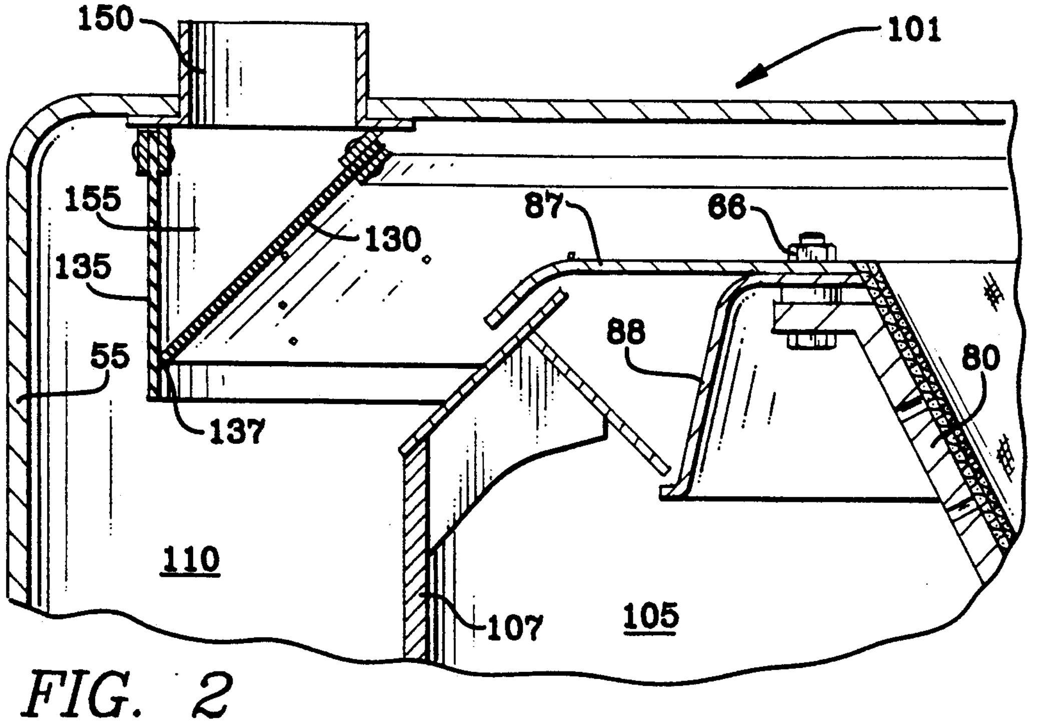

FIG. 2 illustrates a preferred embodiment of the present invention. In all respects, except for incorporation of the invention, the features of the centrifugal are the same as described for FIG. 1.

The invention provides for a shock absorbing structure which is interposed between the outer edge of upper shroud 87 and sugar housing 55 so that crystals, as they are slung outwardly from the shroud, collide first with inner member 130 which is a truncated conic surface suspended from the sugar housing top and surrounding centrifugal basket 80. Member 130 has a larger diameter at the bottom than the top and is made of a resilient material such as rubber or another soft polymer. Thus, it deflects crystals downwardly and also absorbs much of their kinetic impact energy. The crystals, so deflected, are diverted from the high energy impact area of the trailing crystals and are thus spared those potentially damaging collisions. This diversion also reduces the tendency to form lumps by dispersing the damp crystals and slowing them, so they dry a bit more, as described below, than they otherwise would, before depositing them in the sugar chamber 110. Outer member 135 also suspended from the top of the sugar housing is concentric with inner member 130 and may also be made from a resilient polymeric or elastomeric material. The lower edge of inner member 130 contacts outer member 135 forming an annular plenum 155 of triangular cross section against the sugar housing top. The lower edge of outer member 135 extends well below its line of intersection with inner member 130, so that sugar crystals which miss, or are deflected shallowly by, member 130 may be re-deflected to sugar chamber 110 by member 135.

Annular plenum 155 subtends the portion of the sugar housing top which includes ventilation pipe 150. When air is forced from pipe 150 into plenum 155, it finally escapes through the unsealed contact line 137 between inner member 130 and outer member 135 of the resilient barrier ring. Air flow through line 137 causes fluttering or vibration of both members which causes crystals, which may tend to stick to the two members and form lumps, to fall freely into sugar chamber 110. This air flow also contributes to added drying of the dispersed sugar crystals as they encounter the air stream below line 137, which further reduces lump forming tendencies.

This invention reduces sugar crystal impact damage by providing shock-absorbing targets against which the crystals are slung by the centrifugal basket; by deflecting crystals downwardly from the targets so that trailing crystals do not make high speed impacts against leading crystals; and by preventing sticking of crystals to the shock-absorbing targets, thereby preventing high speed impacts against stuck leading crystals by trailing crystals. Lump formation is decreased primarily by the deflection of crystals by the shock absorbing members and by the fluttering or vibration of those members which is caused by air flow from the plenum through the contact line between the inner and outer members. This air flow also reduces moisture content which further discourages lump formation.

What is claimed is:

1. An apparatus for reducing sugar crystal impact damage and lump formation in combination with a sugar centrifugal having a sugar housing surrounding a concentrically mounted rotatable centrifugal basket, comprising:

a shock absorbing barrier ring means extending, in a downward direction, from a top surface of said sugar housing to a point located below a top edge of said centrifugal basket and concentrically surrounding said centrifugal basket, said barrier ring means comprising one substantially cylindrical member and one truncated conical member said conical member being mounted within, and converging downward to make contact with, said substantially cylindrical member.

2. The apparatus of claim 1, further comprising:

means for vibrating the barrier ring means to release sugar crystals from said barrier ring means and to thereby prevent lump formation.

3. The apparatus of claim 2, wherein the means for vibrating said barrier ring means comprises a downward current of air passing through a circular line of contact between said substantially cylindrical member and said truncated conical member, both of which members may be made from a resilient flexible material.

4. A method for reducing sugar crystal impact damage and lump formation in a sugar centrifugal having a rotatable centrifugal basket concentrically mounted within a sugar housing, comprising:

mounting a resilient barrier ring means concentrically with and outwardly from a top edge of said centrifugal basket for absorbing impact of sugar crystals being thrown from said centrifugal basket thereby limiting damage to said crystals; and vibrating the resilient barrier ring means to reduce build-up of sugar crystals on said barrier ring means thereby reducing lump formation.

* * * * *